United States Patent
Ota et al.

(10) Patent No.: US 6,798,728 B2
(45) Date of Patent: Sep. 28, 2004

(54) OPTICAL DISK DEVICE AND LUMINESCENT POWER CONTROL METHOD FOR SEMICONDUCTOR LASER

(75) Inventors: Masataka Ota, Hitachinaka (JP); Masanori Matsuzaki, Hitachinaka (JP); Hisataka Sugiyama, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 317 days.

(21) Appl. No.: 10/080,388

(22) Filed: Feb. 25, 2002

(65) Prior Publication Data

US 2003/0099174 A1 May 29, 2003

(30) Foreign Application Priority Data

Nov. 26, 2001 (JP) .................... 2001-358673

(51) Int. Cl.$^7$ .................................. G11B 7/00
(52) U.S. Cl. ........................ 369/116; 369/53.26
(58) Field of Search ........................ 369/116, 47.5, 369/47.57, 47.52, 47.53, 59.11, 53.26; 372/29.021, 31, 38.02; 250/205

(56) References Cited

U.S. PATENT DOCUMENTS

| | | | | |
|---|---|---|---|---|
| 4,845,720 A | * | 7/1989 | Koishi et al. ................. 372/31 |
| 5,721,580 A | * | 2/1998 | Tateishi et al. ............. 347/246 |
| 6,246,659 B1 | * | 6/2001 | Suzuki et al. ............... 369/116 |
| 6,333,909 B1 | * | 12/2001 | Zaima ........................ 369/116 |
| 6,339,578 B1 | * | 1/2002 | Sasaki et al. ............... 369/116 |
| 6,466,595 B2 | * | 10/2002 | Asano .................... 372/29.021 |
| 6,490,302 B1 | * | 12/2002 | Koishi et al. ............. 372/38.02 |
| 6,671,248 B2 | * | 12/2003 | Miyabata et al. ........... 369/116 |
| 6,683,836 B2 | * | 1/2004 | Miyagawa et al. .......... 369/116 |
| 6,728,178 B2 | * | 4/2004 | Koishi et al. ............. 369/47.53 |

FOREIGN PATENT DOCUMENTS

| JP | 04-263130 | 9/1992 |
|---|---|---|
| JP | 11-213428 | 8/1999 |
| JP | 2000-244054 | 9/2000 |

* cited by examiner

*Primary Examiner*—Thang V. Tran
(74) *Attorney, Agent, or Firm*—McDermott Will & Emery LLP

(57) ABSTRACT

A means for measuring the temperature in the surroundings of a semiconductor laser is provided and, if the temperature is not above a certain level, power correction is performed at high speed by linearly approximating the I-H characteristic according to one item out of reproduction power and multi-pulse recording power, or if the temperature is higher, accurate power correction of the semiconductor laser is accomplished by detecting a plurality of items out of reproduction power and multi-pulse recording power.

12 Claims, 11 Drawing Sheets

OPTICAL DISK DEVICE AND LUMINESCENT POWER CONTROL METHOD FOR SEMICONDUCTOR LASER

BACKGROUND OF THE INVENTION

The present invention relates to an optical disk device and a luminescent power control method for semiconductor laser, whereby a laser beam emitted from a laser beam source is focused into a minute light spot to irradiate an optical disk, which is an information recording medium to optically record or reproduce information, and more particularly to a luminescent power control technique for semiconductor laser to permit precise control of the luminescent power of the semiconductor laser according to changes in ambient temperature.

DESCRIPTION OF THE RELATED ART

For optical recording/reproduction device including optical disk devices, the density, recording speed and reliability are progressively increasing. In an optical disk device, a spindle motor or the like is used to turn an optical disk, and a laser beam emitted from a semiconductor laser is focused into a minute light spot of about 1 μm in diameter to irradiate the optical disk. Recording of information is achieved by modulating the luminescent power of the semiconductor laser into a pulse shape on according to information signals to vary the intensity of the light spot to irradiate the optical disk, and forming a recording mark by using temperature variations occurring on the recording film of the optical disk. Information is reproduced by keeping the luminescent power of the semiconductor laser at a constant low level, detecting the intensity variations and other factors of the reflected light from the optical disk, and converting them into electric signals. Erasion of recording marks is accomplished by irradiating the optical disk, with the luminescent power of the semiconductor laser kept at a constant level between the power level at the time reproduction and the peak level of the recording pulse. In order to achieve information recording in a high density, it is necessary to form minute marks in the same shape all the time, and this requires highly precise and fast control of the luminescent power of the semiconductor laser.

One of the known methods for this control is to divide the pulse of the recording power (in a multi-pulse system) to form minute marks or pits on the recording face of the optical disk, and to vary its power level in multiple values. One example of this method is disclosed in JP-A-2000-244054 as a method for setting a multi-pulse recording waveform and recording power. FIG. 6A illustrates the shape of recording marks on an optical disk, wherein reference numeral 101 denotes recording marks, and 102, a space between recording marks. In FIG. 6B, a solid line 103 represents a multi-pulse recording waveform; a horizontal axis 104, the time; and a longitudinal axis 105 the luminescent power level of the semiconductor laser. When the space 102 is to be recorded, the semiconductor laser is caused to emit light with erasion power of Bias 1 to erase the background mark. To record a mark 101, the laser power is set to a plurality of levels including Peak 1, Peak 2, Bias 2 and Bias 3, and the plurality of laser power levels are pulse-modulated to uniformize the heat working on the recording mark, resulting in a stable recording mark 101. Read in the diagram represents the laser power at the time of reproduction. In the recording waveform shown in FIG. 6, recording requires setting of a total of five levels of laser power.

The laser power setting method disclosed in JP-A-2000-244054 will be described below. First, the semiconductor laser is caused to emit light, and drive currents to give Peak 1, Bias 1 and Bias 3 are set. They are counterparts to points P1, B1 and B3, respectively, in the graph representing the I-L characteristic in the left part of FIG. 7. In a linear region 113*a* in which the I-L characteristic can sufficiently approximate a straight line, a linear formula represented by a broken line L1 is obtained from the two points, P1 and B1, to figure out a semiconductor laser driving amperage which will give Peak 2. Next, a one-dot chain line L2 is obtained from the two points, B1 and B3, to figure out a semiconductor laser driving amperage which will give Bias 2, corresponding to a nonlinear region 113*b*. Thus it is made possible to set five-point power levels from three-point measurement results by approximating a power level corresponding to the linear region and another power level corresponding to the nonlinear region from separate linear formulas and, in each region, obtaining a third point by interpolation into two-point measurement results using a linear expression.

The linear approximation method described above with reference to an example of the prior art whereby a third point is obtained by interpolation into two-point measurement results using a linear expression is suitable for an optical disk device for continuous recording for a long duration, because it does not take a long time for measurement and arithmetic operation and permits real-time recording power correction. However, for an optical disk recorder whose interior is subject to a high temperature rise when used for continuous recording or reproduction for many hours or an optical disk camera often used in a high-temperature ambience, such as outdoors in summer time, the surroundings of the semiconductor laser are highly heated, and even on the high power side of the semiconductor laser the I-L characteristic may deviate from a straight line and become curved. There is a problem that, where the I-L characteristic of the semiconductor laser becomes curved, calculation by linear approximation as in the above-cited example of the prior art is subject to deterioration of the power setting accuracy of the recording pulse waveform, unevenness of recording marks, deterioration in the quality of reproduced signals and resultant difficulty to reproduce information in high density. Nor is there adequate consideration for power correction of the semiconductor laser or speed increase.

SUMMARY OF THE INVENTION

An object of the present invention is to solve the problem noted above, and provide a semiconductor laser luminescent power control unit capable of accurately controlling the luminescent power of the semiconductor laser in an optical recording/reproduction device, such as an optical disk device wherein information is recorded or reproduced optically by focusing a laser beam emitted from a laser beam source into a minute light spot and irradiating therewith an optical disk, which is an information recording medium, even when the surroundings of the semiconductor laser are heated to a high temperature.

In order to solve the problems noted above, according to the invention, there are provided a means to measure the ambient temperature of a semiconductor laser and a means to switch over, when the temperature of the semiconductor laser rises to so high a level that the I-L characteristic on the high power side can no longer be linearly approximated, the method for computing the drive current for a current generating means for driving the semiconductor laser on the basis of the output of a power detecting unit.

More specifically, according to a first aspect of the invention, there is provided an optical disk device provided with a semiconductor laser, a current generator for supplying a D.C. or pulse-shaped drive current to the semiconductor laser, a power detecting unit for detecting the luminescent power of the semiconductor laser, a peak detector for detecting the peak level of the output signal of the power detector, a bottom detector for detecting the bottom level of the output signal of the power detector, an arithmetic and control unit having programs for computing the drive current of the semiconductor laser and controlling the drive current of the current generator according to the result of computation, and a thermal detector for detecting the temperature of the semiconductor laser, wherein the arithmetic and control unit has a plurality of current computing programs for computing the semiconductor laser drive current by different methods and a program for selecting one current computing program, out of the plurality of current computing programs, according to a temperature signal supplied by the thermal detector.

According to a second aspect of the invention, the plurality of current computing programs possessed by the arithmetic and control unit in the optical disk device according to the first aspect of the invention include a first current computing program for acquiring the temperature of the semiconductor laser from a temperature signal supplied by the thermal detector and computing the drive current of the semiconductor laser from the output signal of the power detecting unit and the output signal of the peak detector, and a second current computing program for computing the drive current of the semiconductor laser from the output signal of the power detecting unit, the output signal of the peak detector and the output signal of the bottom detector, wherein the program for selecting the current computing program selects the first current computing program if the temperature of the semiconductor laser is below a prescribed level or the second current computing program if the temperature of the semiconductor laser is above the prescribed level.

According to a third aspect of the invention, the optical disk device according to the second aspect of the invention is further provided with an automatic power control circuit for keeping the luminescent power of the semiconductor laser constant by supplying a D.C. drive current to the semiconductor laser, and the plurality of current computing programs possessed by the arithmetic and control unit include a third current computing program for acquiring the temperature of the semiconductor laser from a temperature signal supplied by the thermal detector and computing the drive current of the semiconductor laser from the output signal of the peak detector, and a fourth current computing program for computing the drive current of the semiconductor laser from the output signal of the peak detector and the output signal of the bottom detector, wherein the program for selecting the current computing program selects the third current computing program if the temperature of the semiconductor laser is below a prescribed level or the fourth current computing program if the temperature of the semiconductor laser is above the prescribed level.

According to a fourth aspect of the invention, there is provided an optical disk device provided with a semiconductor laser, a current generator for supplying a D.C. or pulse-shaped drive current to the semiconductor laser, a power detecting unit for detecting the luminescent power of the semiconductor laser, a peak detector for detecting the peak level of the output signal of the power detector, a bottom detector for detecting the bottom level of the output signal of the power detector, and an arithmetic and control unit having programs for computing the drive current of the semiconductor laser and controlling the drive current of the current generator according to the result of computation, wherein the arithmetic and control unit has a temperature variation detecting program for detecting any temperature variation in the semiconductor laser, a plurality of current computing programs for computing the semiconductor laser drive current by different methods, and a program for selecting one current computing program, out of the plurality of current computing programs, according to the result obtained by the temperature variation detecting program.

According to a fifth aspect of the invention, the plurality of current computing program possessed by the arithmetic and control unit in the optical disk device according to the fourth aspect of the invention include a first current computing program for computing the drive current of the semiconductor laser from the output signal of the power detecting unit and the output signal of the bottom detector, and a second current computing program for computing the drive current of the semiconductor laser from the output signal of the power detecting unit, the output signal of the peak detector and the output signal of the bottom detector, wherein the program for selecting the current computing program selects the first current computing program if the result obtained by the temperature variation detecting program is below a prescribed level or the second current computing program if the result obtained by the temperature variation detecting program is above the prescribed level.

According to a sixth aspect of the invention, the optical disk device according to the fifth aspect of the invention is further provided with an automatic power control circuit for keeping the luminescent power of the semiconductor laser constant by supplying a D.C. drive current to the semiconductor laser, wherein the plurality of current computing programs possessed by the arithmetic and control unit include a third current computing program for computing the drive current of the semiconductor laser from the output signal of the bottom detector, and a fourth current computing program for computing the drive current of the semiconductor laser from the output signal of the peak detector and the output signal of the bottom detector, the program for selecting the current computing program selecting the third current computing program if the result obtained by the temperature variation detecting program is below a prescribed level or the fourth current computing program if the result obtained by the temperature variation detecting program is above the prescribed level.

According to a seventh aspect of the invention, there is provided a semiconductor laser luminescent power control method comprising a step of supplying a D.C. or pulse-shaped drive current to a semiconductor laser, a power detecting step of detecting the luminescent power of the semiconductor laser, a peak detecting step of detecting the peak level of the output signal obtained at the power detecting step, a bottom detecting step of detecting the bottom level of the output signal of the power detecting step, steps of computing the drive current of the semiconductor laser, and a thermal detecting step of detecting the temperature of the semiconductor laser, wherein the steps of computing the drive current of the semiconductor laser have a plurality of current computing steps of computing the semiconductor laser drive current by different methods and a step of selecting one current computing step, out of the plurality of current computing steps, according to a temperature signal detected at the thermal detecting step.

According to an eighth aspect of the invention, the steps of computing the drive current of the semiconductor laser according to the seventh aspect of the invention include a first current computing step of acquiring the temperature of the semiconductor laser at the thermal detecting step and computing the drive current of the semiconductor laser from the output signals of the power detecting step and the peak detecting step, and a second current computing step of computing the drive current of the semiconductor laser from the output signal of the power detecting step, the output signal of the peak detecting step and the output signal of the bottom detecting step, wherein at the step of selecting the current computing step there is selected the first current computing step if the temperature of the semiconductor laser is below a prescribed level or the second current computing step if the temperature of the semiconductor laser is above the prescribed level.

According to a ninth aspect of the invention, the method according to the eighth aspect of the invention is further provided with an automatic power control step of keeping the luminescent power of the semiconductor laser constant by supplying a D.C. drive current to the semiconductor laser, wherein the plurality of current computing steps include a third current computing step of acquiring the temperature of the semiconductor laser from a temperature signal supplied at the thermal detecting step and computing the drive current of the semiconductor laser from the output signal of the peak detecting step, and a fourth current computing step of computing the drive current of the semiconductor laser from the output signal of the peak detecting step and the output signal of the bottom detecting step, the current computing step of selecting the current computing step selecting the third current computing step if the temperature of the semiconductor laser is below a prescribed level or the fourth current computing step if the temperature of the semiconductor laser is above the prescribed level.

According to a 10th aspect of the invention, there is provided a semiconductor laser luminescent power control method comprising a step of supplying a D.C. or pulse-shaped drive current to a semiconductor laser, a power detecting step of detecting the luminescent power of the semiconductor laser, a peak detecting step of detecting the peak level of the output signal of the power detecting step, a bottom detecting step of detecting the bottom level of the output signal of the power detecting step, and computing and controlling steps of computing and controlling the drive current of the semiconductor laser, wherein the computing and controlling steps have a temperature variation detecting step of detecting any temperature variation in the semiconductor laser, a plurality of current computing steps of computing the semiconductor laser drive current by different methods and a step of selecting one current computing step, out of the plurality of current computing steps, according to the result obtained at the temperature variation detecting step.

According to an 11th aspect of the invention, the plurality of current computing steps according to the 10th aspect of the invention include a first current computing step of computing the drive current of the semiconductor laser from the output signal of the power detecting step and the output signal of the bottom detecting step, and a second current computing step of computing the drive current of the semiconductor laser from the output signal of the power detecting step, the output signal of the peak detecting step and the output signal of the bottom detecting step, wherein the step of selecting the current computing step selects the first current computing step if the result obtained at the temperature variation detecting step is below a prescribed level or the second current computing step if the result obtained at the temperature variation detecting step is above a prescribed level.

According to a 12th aspect of the invention, the method according to the eighth aspect of the invention is further provided with an automatic power control step of keeping the luminescent power of the semiconductor laser constant by supplying a D.C. drive current to the semiconductor laser, wherein the plurality of current computing steps include a third current computing step of computing the drive current of the semiconductor laser from the output signal of the bottom detecting step, and a fourth current computing step of computing the drive current of the semiconductor laser from the output signal of the peak detecting step and the output signal of the bottom detecting step, at the plurality of current computing steps of selecting the plurality of current computing steps there is selected the third current computing step if the result obtained at the temperature variation detecting step is below a prescribed level or the fourth current computing step if the result obtained at the temperature variation detecting step is above the prescribed level.

These and other objects, features and advantages of the invention will be apparent from the following more particular description of preferred embodiments of the invention, as illustrated in the accompanying drawings.

DESCRIPTION OF THE PREFERRED EMBODIMENTS

A first preferred embodiment of the present invention will be described below with reference to FIG. 1 through FIG. 3, FIG. 8 and FIG. 9.

Figure 1:
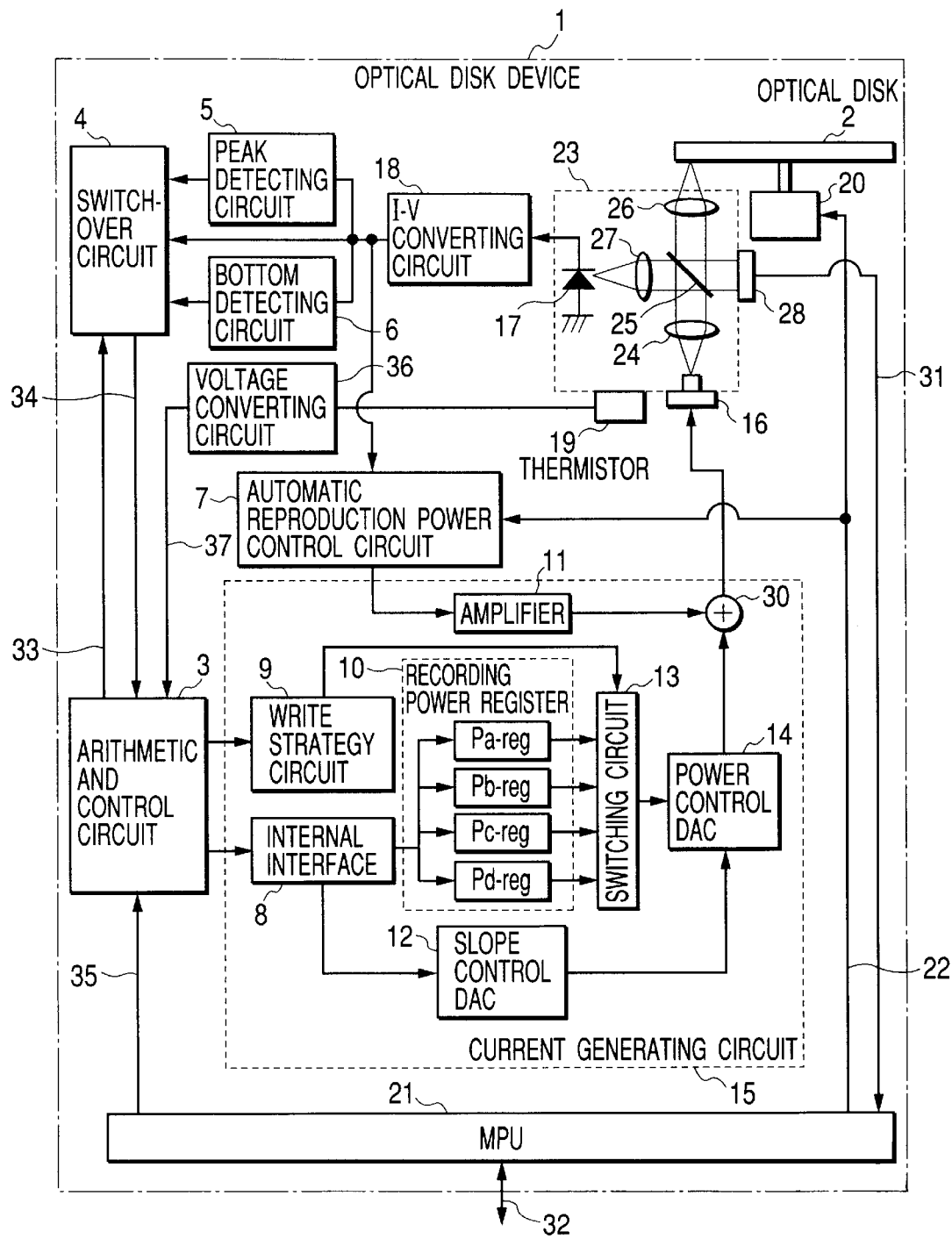
FIG. 1 is a block diagram of an optical disk device, which is a first preferred embodiment of the present invention.

FIG. 1 is a block diagram of an optical disk device, which is the first preferred embodiment of the invention. A one-dot chain line 1 represents an optical disk device, and reference numeral 2 denotes an optical disk, 20, a disk motor, and 21, a microprocessor unit (MPU). When the optical disk 2 is inserted into and fitted to the disk motor 20, the disk motor 20 begins turning, actuated by a signal 22 from the MPU 21, and the optical disk 2 also turns. Reference numeral 23 denotes an optical pickup, consisting of a semiconductor laser 16, a collimating lens 24, a beam splitter 25, a focusing lens 26, a condensing lens 27, a photodiode 17 and an optical detector 28. The photodiode 17 supplies a current signal according to the luminous energy of the received laser beam. Reference numeral 18 denotes an I-V converting circuit, which converts a current signal supplied from the photodiode 17 into a voltage signal. Reference numeral 7 denotes an automatic reproduction power control circuit, which computes and outputs the difference between the voltage signal supplied by the I-V converting circuit 18 and an internal reference voltage. A current generating circuit 15 has an amplifier 11 and an adder 30. The amplifier 11 converts the voltage signal supplied by automatic reproduction power control circuit 7 into a current, amplifies it and supplies it to the semiconductor laser 16 of the optical pickup 23 via the adder 30.

As the optical disk 2 turns, the signal 22 of the MPU 21 causes the reference voltage in the automatic reproduction power control circuit 7 to be set to a prescribed level matching an information reproduction mode. Then, a differential signal supplied from the automatic reproduction power control circuit 7 is turned into a semiconductor laser drive current by the amplifier 11 and the adder 30 and supplied to the semiconductor laser 16, which then emits a laser beam. The laser beam emitted from the semiconductor laser 16 is collimated by the collimating lens 24 into a parallel beam, part of which is reflected by the beam splitter 25 and carried by the condensing lens 27 to the photodiode 17. The luminous energy of the laser beam received by the photodiode 17 is entered into the automatic reproduction power control circuit 7 through the I-V converting circuit 18, and the automatic reproduction power control circuit 7, comparing with the reference voltage in it, supplies a differential signal. This enables the luminescent power of the semiconductor laser 16 to be controlled to be kept at a prescribed reproduction power level even if the temperature of the semiconductor laser 16 varies.

The laser beam of the semiconductor laser 16 controlled to be kept at the prescribed reproduction power level by the automatic reproduction power control circuit 7 is collimated by the collimating lens 24 into a parallel beam, which passes the beam splitter 25 and is focused by the focusing lens 26 onto the optical disk 2. The laser beam reflected by the optical disk 2 is again collimated by the focusing lens 26 into a parallel beam, which is then reflected by the beam splitter 25 to be received by the optical detector 28. From the optical detector 28 are supplied a defocusing signal, an off-track detection signal and a signal reproducing information recorded on the optical disk 2 as signals 31. The defocusing signal and the off-track detection signal are supplied to a two-dimensional lens actuator of a known configuration (not shown), and control of the position of the focusing lens 26 in two directions makes it possible to supply stable reproduced signals. The reproduced signals are transmitted as signals 32 via the MPU 21 to an externally connected computer and the like. The procedure so far described makes possible achievement of the reproduction of information recorded on the optical disk 2.

The luminous energy signal of the laser beam received by the photodiode 17 of the optical pickup 23 is converted into a voltage signal by the I-V converting circuit 18, and the converted signal is entered into both a peak detecting circuit 5 and a bottom detecting circuit 6. If the luminescent power of the semiconductor laser 16 varies in a pulse shape when recording information, the peak detecting circuit 5 detects the peak level of the luminous energy signal supplied by the photodiode 17, and the bottom detecting circuit 6 detects the bottom level of the luminous energy signal supplied by the photodiode 17. Reference numeral 4 denotes a switch-over circuit, which selects with a switch-over signal 33 one out of the output signal of the peak detecting circuit 5, the output signal of the I-V converting circuit 18 and the output signal of the bottom detecting circuit 6, and supplies a selected signal 34. An arithmetic and control circuit 3 receives user data 35 to be recorded, sent via the MPU 21 from a personal computer or some other superior unit, and issues the data and an instruction to the current generating circuit 15 to have the data recorded on the optical disk 2.

The current generating circuit 15 sets values in recording power registers 10 and a slope control digital-to-analog converter (DAC) 12 via an internal interface 8. Referring to FIG. 1, the recording power registers 10 can set four kinds of power levels including Pa-reg, Pb-reg, Pc-reg and Pd-reg. One of these recording power registers 10 is selected by a switching circuit 13 controlled by a write strategy circuit 9, and a multi-pulse for recording data from the arithmetic and control circuit 3 is generated. A value Dp of a power control DAC 14 that determines the amperage of the drive current to be supplied to the semiconductor laser 16 is given by Dp=Rw/Da, where Da is the value of the slope control DAC 12 and Rw, the value of the recording power register 10 selected by the switching circuit 13. The drive current amperage of the semiconductor laser 16 is the sum of the amperage from the power control DAC 14 and the amperage from the automatic reproduction power control circuit 7, both mentioned above. The reason why the slope control DAC 12 is used is to ensure that the value set in the recording power register 10 match the luminescent power of the semiconductor laser 16 unaffected by any fluctuation of the I-L characteristic of each DAC or the semiconductor laser 16, but this embodiment is applicable even without using such a slope control DAC 12. The output current of the power control DAC 14 is added to the output current supplied from the automatic reproduction power control circuit 7 to the semiconductor laser 16 via the amplifier 11.

Reference numeral 19 denotes a thermistor, which detects the temperature of the semiconductor laser 16, and 36, a voltage converting circuit, which converts the output signal of the thermistor 19 into a voltage signal 37. The voltage signal 37 is entered into the arithmetic and control circuit 3, and used for the selection of the method for computation of the semiconductor laser drive current by the arithmetic and control circuit 3.

Figure 8:
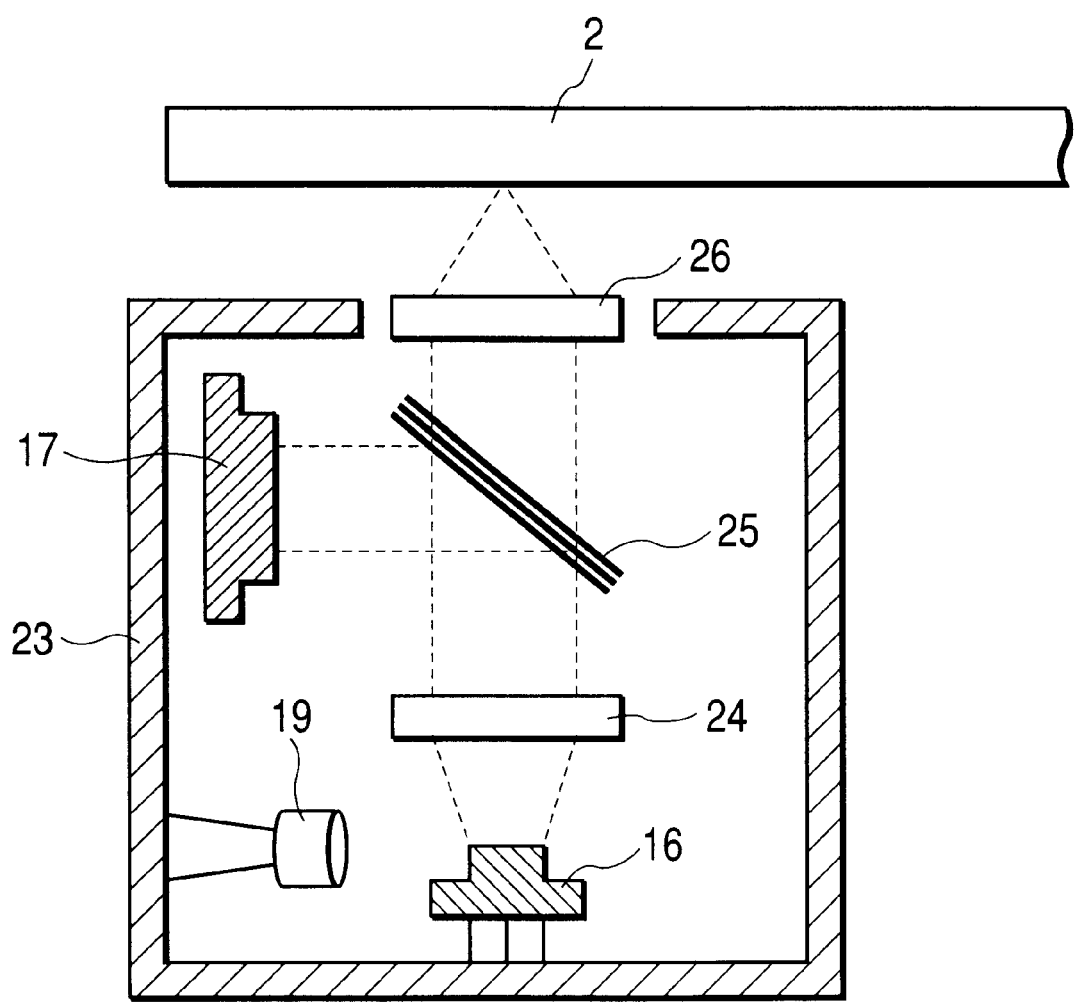
FIG. 8 shows the fitting position of a thermistor 19 in the first preferred embodiment of the invention.
Figure 9:
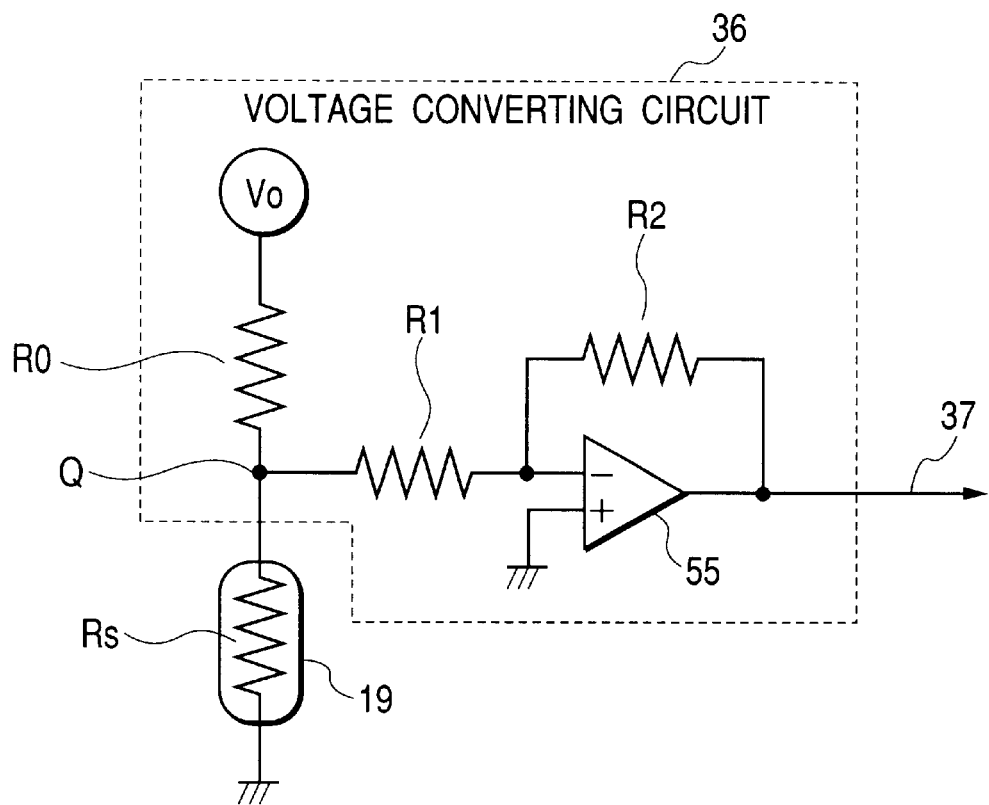
FIG. 9 is a circuit diagram illustrating the configuration of the thermistor 19 and a voltage converting circuit 36 in the first preferred embodiment of the invention.

FIG. 8 shows the fitting position of the thermistor 19. The thermistor 19, fitted near the semiconductor laser 16 of the optical pickup 23, detects the temperature of the semiconductor laser 1. FIG. 9 is a circuit diagram illustrating the configuration of the thermistor 19 and a voltage converting circuit 36. A resistor R0 of the voltage converting circuit 36 and the thermistor 19 are connected in series, and applies a constant voltage Vo. As the internal resistance Rs of the thermistor 19 varies with a temperature change, the potential at a point Q varies. The potential at point Q is amplified by an operational amplifier 55 and another amplifier using a resistor R1 and a resistor R2 and turned into the voltage signal 37.

Figure 2A:
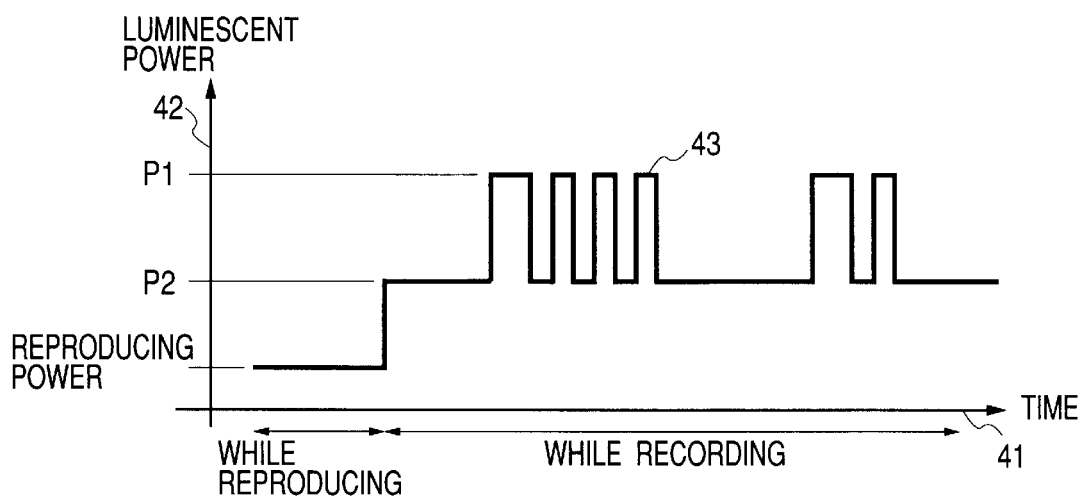
FIG. 2A shows the waveform witnessed when the luminescent power of the semiconductor laser is detected in the first preferred embodiment of the invention, and FIG. 2B, the characteristic of power detection signals by a peak detecting circuit and a bottom detecting circuit.
Figure 2B:
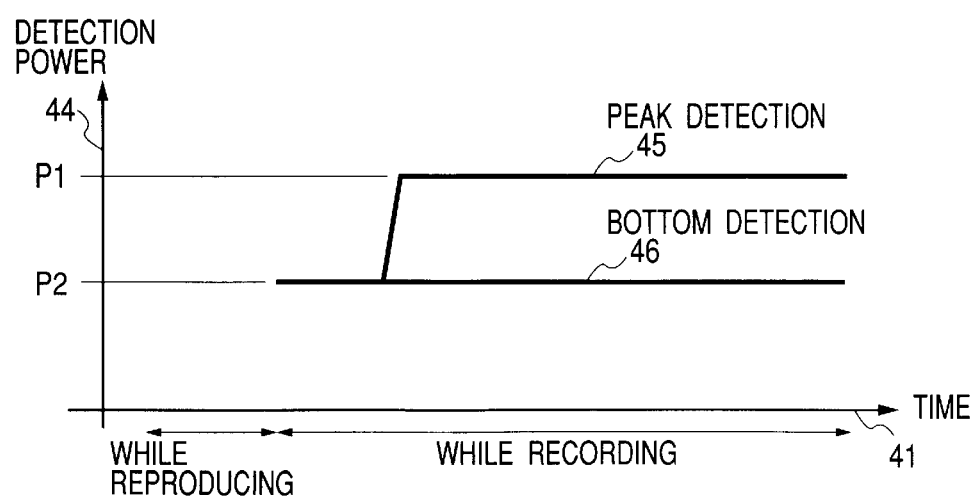

The method for collection of laser power in the first embodiment of the invention will now be described in detail with reference to FIG. 2 and FIG. 3. In FIG. 2A, showing the variation of the luminescent power of the semiconductor laser 16 over time, the horizontal axis 41 represents time, the longitudinal axis 42, the luminescent power, and the solid line 43, the luminescent power of the semiconductor laser 16. In this embodiment, two of the recording power registers 10 are used to form the multi-pulse represented by the solid line 43 in FIG. 2A. Here it is supposed that Pa-reg is responsible for the luminescent power at P1, and Pb-reg, for that at P2. The luminescent power of the semiconductor laser 16 is higher in the order of P2 and P1 at the time of reproduction, wherein P2 and P1 respectively correspond to erasion power and recording power for a changeable-phase optical disk. In FIG. 2B, showing the variations of the powers detected by the peak detecting circuit 5 and the bottom detecting circuit 6 over time, the horizontal axis 41 represents time as in FIG. 2A, the longitudinal axis 44, detection power, the solid line 45, the output signal of the peak detecting circuit 5, and the solid line 46, the output signal of the bottom detecting circuit 6. The peak detecting circuit 5, consisting of a circuit for detecting the peak level of the voltage signal supplied by the I-V converting circuit 18, can detect the P1 power of the multi-pulse 43 shown in FIG. 2A. On the other hand, the bottom detecting circuit 6, consisting of a circuit for detecting the bottom level of the voltage signal supplied by the I-V converting circuit 18, can similarly detect the P2 power.

Figure 3:
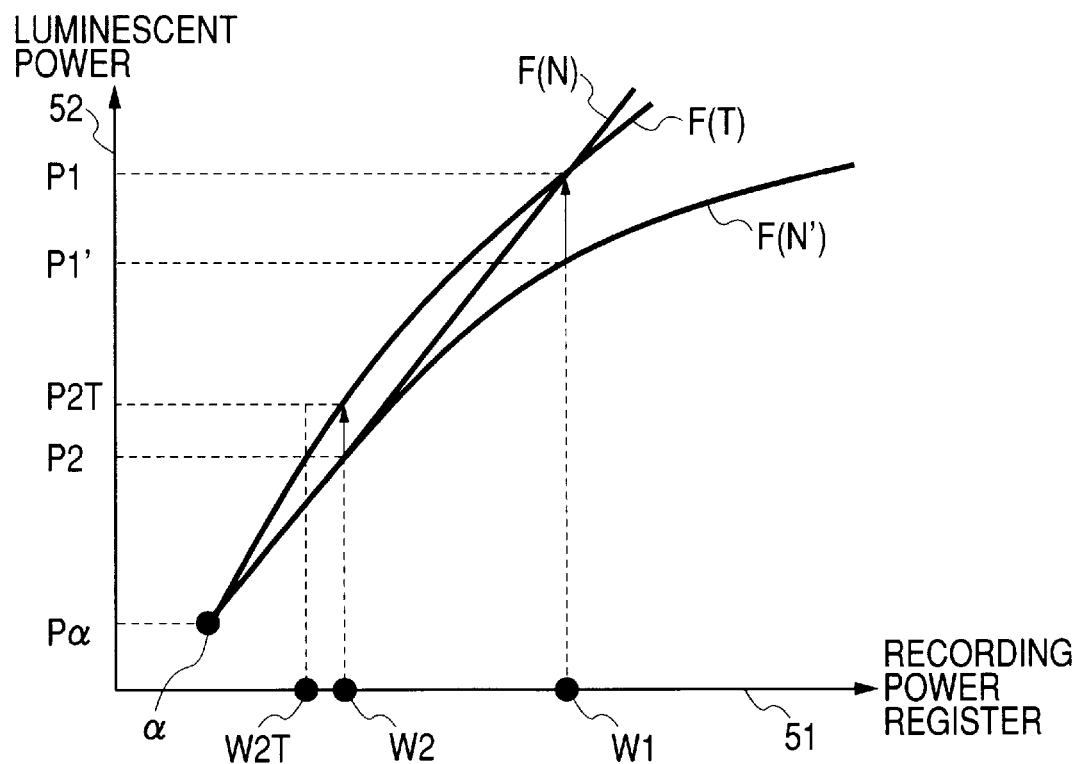
FIG. 3 is a characteristic diagram showing the relationship between values set by a recording power register and the luminescent power of the semiconductor laser in the first preferred embodiment of the invention.

FIG. 3 is a graph showing the relationship between values set by the recording power register 10 and by the luminescent power of the semiconductor laser 16. The horizontal axis 51 represents the value set by the recording power register 10, the longitudinal axis 52, the luminescent power of the semiconductor laser 16, and the straight line F(N), the luminescent power of the semiconductor laser 16 in the vicinity of the room temperature. Point α is the point of operation by the automatic reproduction power control circuit 7 alone, where the semiconductor laser 16 is emitting light at reproduction power Pα with all the recording power registers 10 at a zero value.

Point α indicates that the functioning of the automatic reproduction power control circuit 7 keeps reproduction power Pα constant all the time even when the temperature of the semiconductor laser 16 varies. A W1 is set in Pa-reg of the recording power registers 10, a value W2 in Pb-reg of the same, and a value Da in the slope control DAC 12. The value of the power control DAC 14 is Dp1=W1/Da when Pa-reg is selected, or Dp2=W2/Da when Pb-reg is selected, by the switching circuit 13. The power control DAC 14 supplies a current matching Dp1 or Dp 2, the adder 30 adds a current matching reproduction power Pα, and the semiconductor laser 16 emits luminescent power at P1 or P2. As stated above, the peak detecting circuit 5 and the bottom detecting circuit 6 detect luminescent powers P1 and P2, respectively.

The first embodiment of the invention is characteristic in that the method for recording power correction is altered in response to the output signal 37 of a temperature detecting means by the thermistor 19 and the voltage converting circuit 36 in FIG. 1. This correcting method will be described below. First, when the temperature of the semiconductor laser 16 is not higher than a certain level, the I-L characteristic can sufficiently approximated by a linear function, and therefore the line F(N) is computed by the arithmetic and control circuit 3 from the output of the peak detecting circuit 5 and the two points of reproduction power Pα kept by the automatic reproduction power control circuit 7, and the value Da of the slope control DAC 12 is corrected to Da'. In this case, since reproduction power Pα is fixed in the arithmetic and control circuit 3, the only variable used in the computation is the output from the peak detecting circuit 5. Thus, the use of the automatic reproduction power control circuit provides the advantage that only one datum suffices where two data would otherwise be needed, and only two are sufficient even at a high temperature where three would be usually required. To add, where no automatic reproduction power control circuit is used, obviously the present invention can still be applied though a greater number of data would have to be measured.

On the other hand, if the temperature rises and the I-L characteristic becomes curved, the correction of recording power is altered to a two-step method. Curve F(N') in FIG. 3 shows the relationship of the recording power registers 10 versus luminescent power before the correction of recording power when the semiconductor laser 16 is high. The first step of correction is to correct the value of the slope control DAC 12 according to detection power P1' of the peak detecting circuit 5 and target power P1. Thus, the value of the slope control DAC 12 is corrected to Da' so at to adjust the detection power at the peak detecting circuit 5 to P1. The result of this first step of correction is curve F(T). As is evident from the graph, the luminescent power matching W1 set by the recording power register Pa-reg is P1 and there is no problem about it, but the luminescent power matching W2 set by the recording power register Pb-reg is P2T, far deviating from P2, which is the desired power. Then, as the second step of correction, the value of the recording power register Pb-reg is corrected according to detection power P2T of the bottom detecting circuit 6 and target power P2. Thus the value of Pb-reg is corrected from W2 to W2T so as to adjust the detection power at the bottom detecting circuit 6 to P2. The quantity of correction can be, for instance, W2T=W2×P2/P2T. Thus, the presence of the temperature detecting means consisting of the thermistor 19 and the voltage converting circuit 36 makes possible recording power correction matching the temperature of the semiconductor laser, which is impossible according to the prior art. Where the temperature of the semiconductor laser is not higher than a certain level, high speed operation is made possible by causing only peak detection to function, and even where the temperature of the semiconductor laser is high enough to give the I-L characteristic a curved shape, recording power can be controlled accurately.

Although this embodiment of the invention has been described, for the sake of simplicity of description, with reference to a case in which the multi-pulse is formed of two levels of power, obviously the invention can as well be applied where it is formed of three or more levels of power.

Further, though the temperature detecting means referred to in the foregoing description consists of the thermistor 19 and the voltage converting circuit 36, a thermal sensor IC, in which a thermal detection element and an electronic circuit for supplying its detection signal are integrated, can as well be used. For instance, a thermal sensor IC named LM20 is commercially available from National Semiconductor Corporation.

Figure 10:
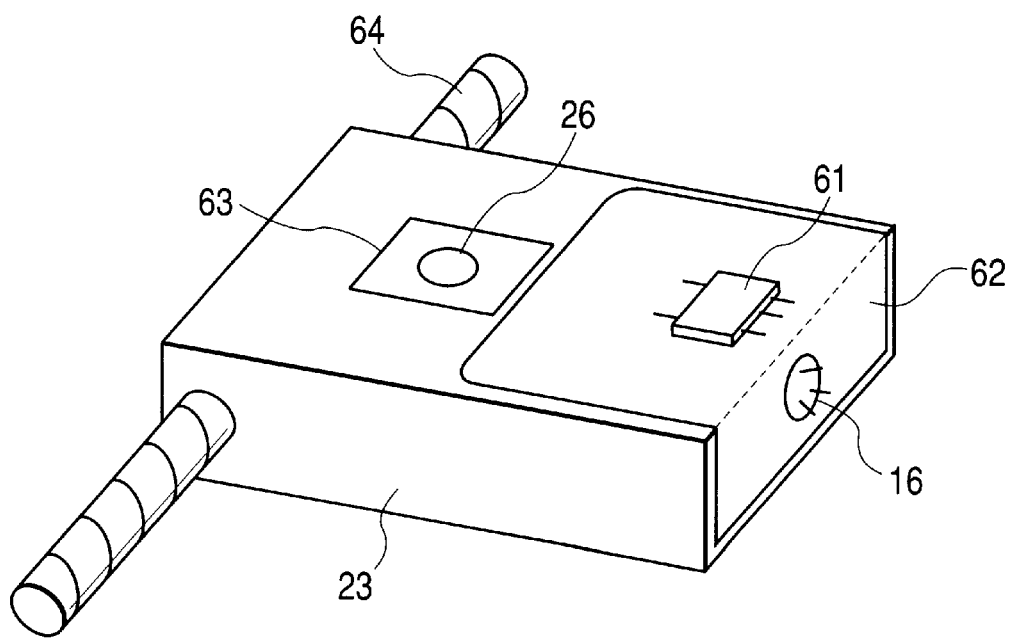
FIG. 10 illustrates mounting onto an optical pickup in another preferred embodiment of the invention using a thermal sensor IC.

FIG. 10 illustrates mounting onto an optical pickup using a thermal sensor IC. Reference numeral 23 denotes an optical pickup, 63, a two-dimensional lens actuator, 26, a focusing lens and 64, a shaft for shifting the optical pickup 23 in the radial direction of the optical disk. A thermal sensor IC 61 and the semiconductor laser 16, after being soldered onto an optical head board 62, which is a flexible electronic circuit board, is closely attached to the housing of the optical pickup 23. As the heated generating from the semiconductor laser 16 is transmitted to the thermal sensor IC 61 through the housing of the optical pickup 23, the thermal sensor IC 61 can accurately detect the temperature of the semiconductor laser 16.

To add, instead of arranging the thermistor 19 and the thermal sensor IC 61 near the semiconductor laser 16 as the temperature detecting means, it is also possible to infer the temperature from any variation in detection power P1 at the peak detecting circuit 5.

Figure 12:
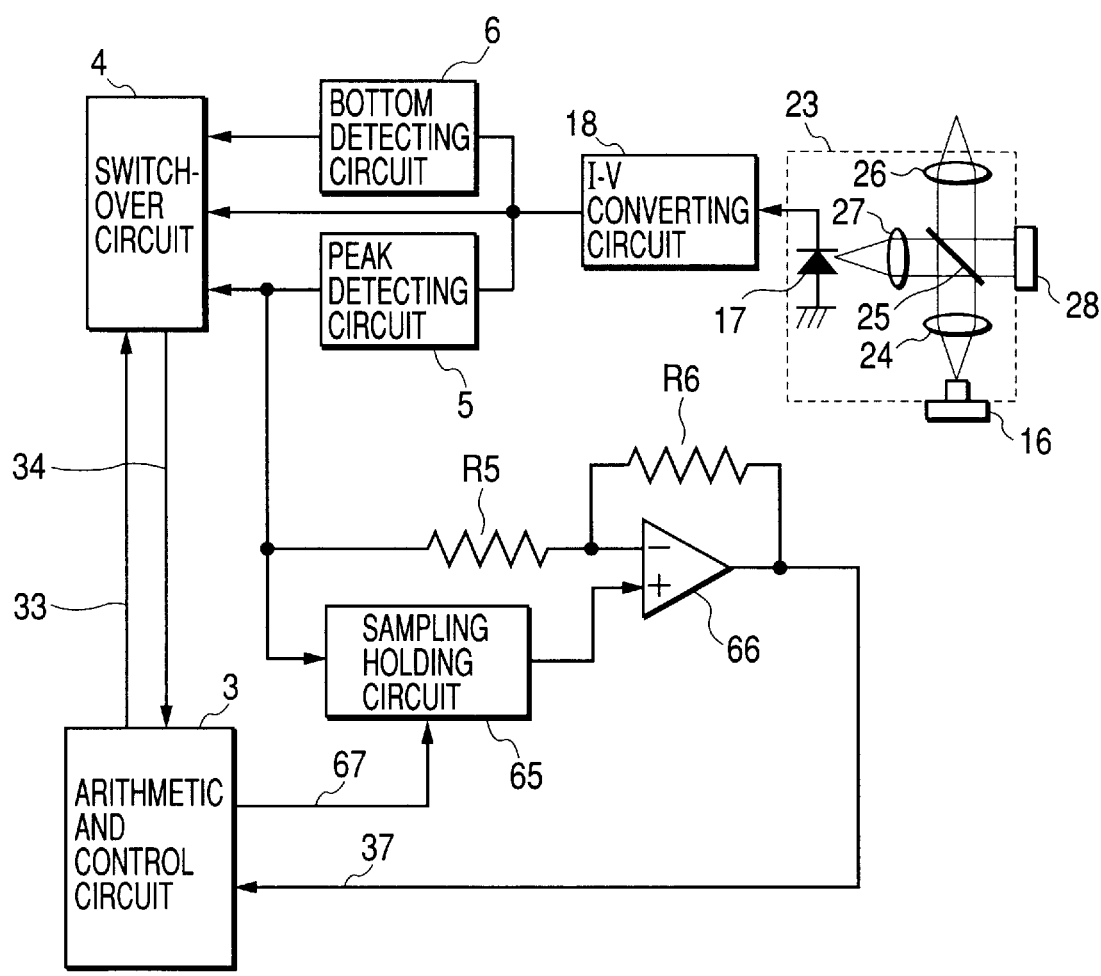
FIG. 12 is a partial block diagram of an optical disk device, which is a second preferred embodiment of the invention.

Next will be described a second preferred embodiment of the present invention, which is an optical disk device characterized in that the temperature is inferred from any variation in the output signal of the peak detecting circuit. FIG. 12 is a partial block diagram of the optical disk device, which is the second embodiment. In this optical disk device, which is the second preferred embodiment of the invention, a sampling holding circuit 65 and an operational amplifier 66 are used as the temperature detecting means in place of the thermistor 19 and the thermal sensor IC 61 shown in FIG. 1. Other constituent parts are the same as their respective counterparts in the optical disk device 1, which is the first embodiment of the invention described with reference to FIG. 1, and assigned the same reference numerals as in FIG. 1. The sampling holding circuit 65, in response to a the timing signal 67 supplied by the arithmetic and control circuit 3, takes in a voltage signal supplied by the peak detecting circuit 5, and holds its value until the next timing signal is issued. A differential amplifier composed of the operational amplifier 66, a resistor R5 and a resistor R6 computes difference between a voltage signal supplied by the peak detecting circuit 5 and the voltage signal held by the sampling holding circuit 65, and supplies a signal 37.

For instance, immediately after the start of recording of information onto the optical disk 2, the arithmetic and control circuit 3 issues the timing signal 67, and the sampling holding circuit 65 takes in a voltage signal supplied by the peak detecting circuit 5 and holds its value. Immediately after the start of recording, the voltage signal supplied by the peak detecting circuit 5 and the voltage signal held by the sampling holding circuit 65 are equal, and the signal 37 is at the zero level. As the recording of information is continued, the temperature of the semiconductor laser 16 rises and the laser power supplied by the semiconductor laser 16 drops. Then, as the level of the voltage signal supplied by the peak detecting circuit 5 drops, the level of the signal 37 supplied by the operational amplifier 66 varies. Accordingly, the temperature change in the semiconductor laser 16 can be detected from the variation in the signal 37.

A third preferred embodiment of the present invention will now be described with reference to FIG. 4 and FIG. 5. The third embodiment has the same configuration as the optical disk device 1, which is the first embodiment of the invention, described with reference to FIG. 1, except that the arithmetic and control circuit 3 has a microcomputer and programs to be executed by the microcomputer embodies ingenuity. Therefore, the description the configuration and the constituent parts of the optical disk device will be dispensed with, and the constituent parts will be referred to by the same numerals as their respective counterparts in FIG. 1.

Figure 4:
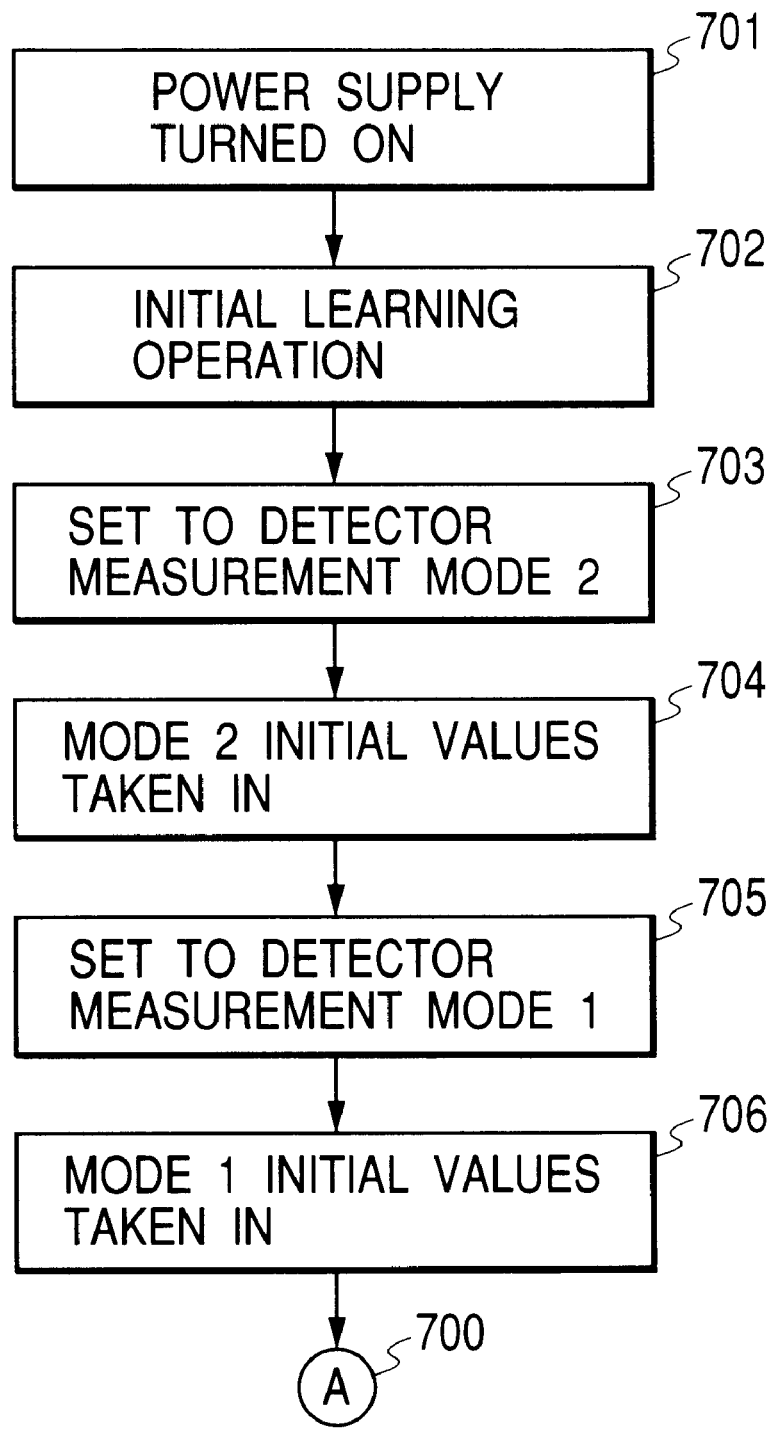
FIG. 4 is a flow chart for describing correction to be applied to a current generating means by using a thermal sensor in a third preferred embodiment of the invention at the time of recording.
Figure 5:
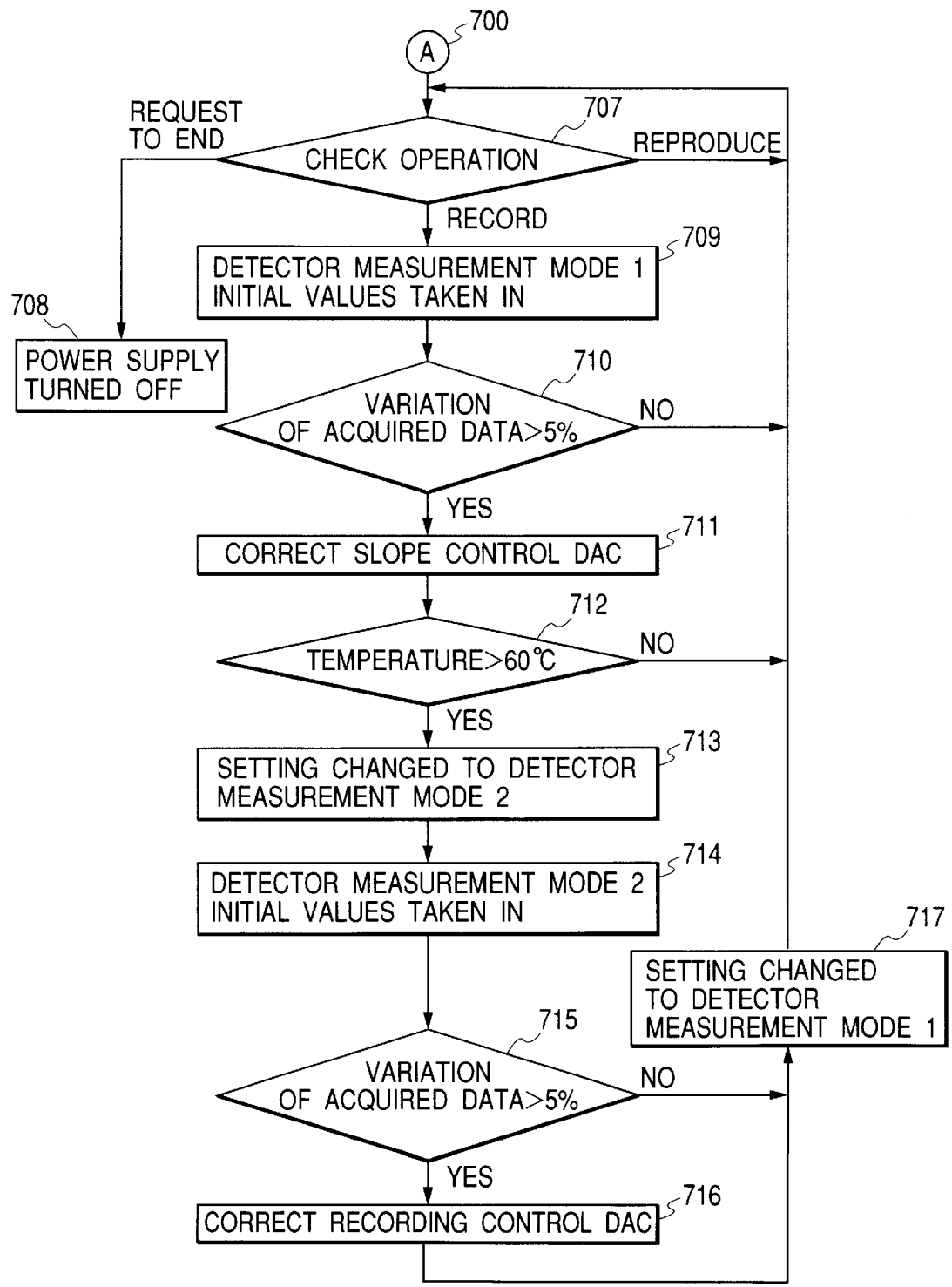
FIG. 5 is a flow for describing correction to be applied to the current generating in the third preferred embodiment of the invention.
Figure 6A:
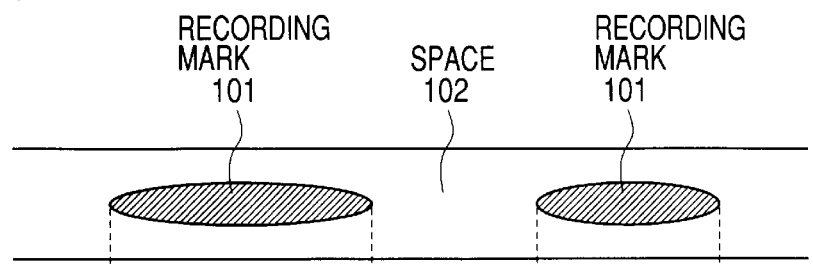
FIG. 6A illustrates recording marks in an optical disk recording/reproduction device according to the prior art, and FIG. 6B, a recording pulse waveform.
Figure 6B:
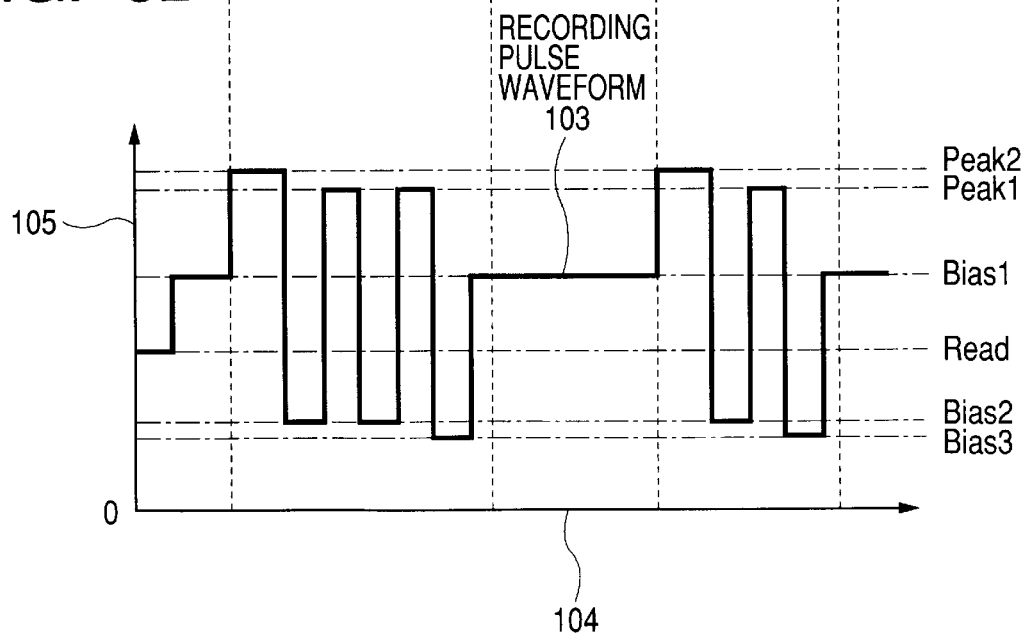
Figure 7:
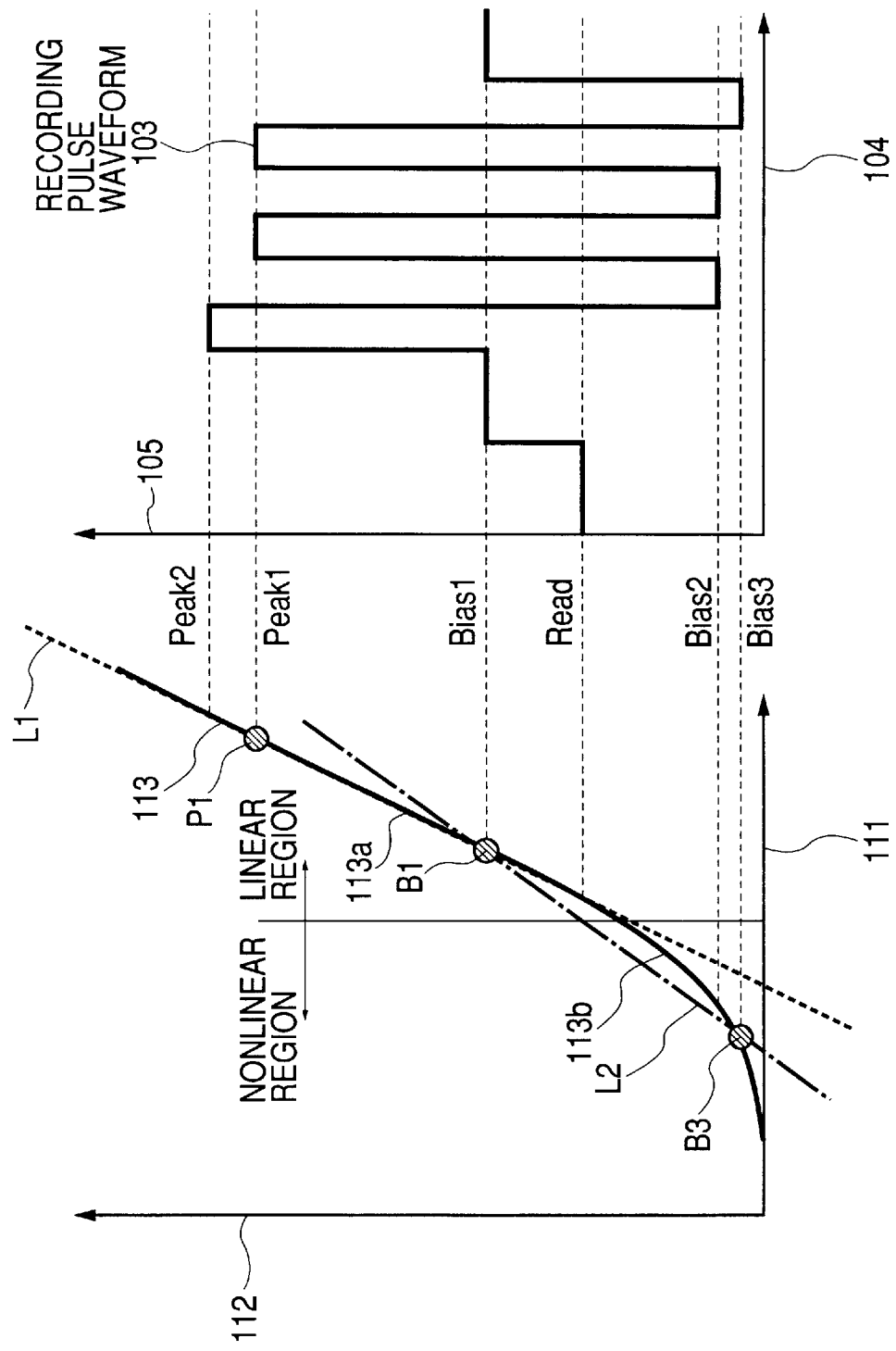
FIG. 7 shows the relation between the I-L characteristic and the recording pulse waveform in the optical disk recording/reproduction device according to the prior art and the concept of the approximating method for controlling luminescent power.

FIG. 4 and FIG. 5 are flowcharts of a program to be executed by the microcomputer possessed by the arithmetic and control circuit 3 of the optical disk device effectively utilizing, the temperature detecting means. FIG. 4 and FIG. 5 are flow charts of one program, the flows in the two charts being connected by a terminal A numbered 700. First, the power supply to the optical disk device 1 is turned on (701) to perform an initial learning operation (702). The initial learning operation includes gain offset learning by a servo means and test writing in search of the optimal recording power. Next, a measurement mode 2 is set to detect the bottom power of the multi-pulse recording waveform (703) to take in initially learned values P2 (704). Similarly, a measurement mode 1 is set to detect the peak power of the multi-pulse recording waveform (705) to take in initially learned values P1. Then the optical disk device is placed in a check operation state (707). If a reproduction request comes from a superior unit or elsewhere, reproduction is performed, followed by a return to the check operation state (707). If an end request comes, the power supply is turned OFF (708).

If a recording request comes, data are taken in with the measurement mode 1 to detect the peak power kept as it is while recording is carried out (709). The data taken in are compared with the previous values in the measurement mode 1 (if it is the first time, compared with the initial learned values P1) (710), and if the variance is not more than 5%, a return to the check operation state follows (707). Or if the variance is greater than 5%, the value of the slope control DAC is corrected (711). Then the temperature is measured with the temperature detecting means (712) and if it is no higher than 60° C. for instance, a return to the check operation state follows. Or if it is over 60° C., it is judged that the I-L characteristic may have deviated from a straight line and become curved, the detector is switched over to the mode 2 for detecting the bottom power (713) to take in data in the measurement mode 2 (714). The data taken in are compared with the previous values in the measurement mode 2 (if it is the first time, compared with the initial learned values P2) (715), and if the variance is not more than 5%, the detector is switched over to the measurement mode 1 (711), followed by a return to the check operation state (707). Or if the variance is greater than 5%, the value of the recording power register is corrected (716), and the detector is switched over to the measurement mode 1 (711), followed by a return to the check operation state (707). If the temperature subsequently drops to 60° C. or less, correction in the mode 1 alone is performed.

The presence of this temperature detecting means makes it possible, at a temperature where the I-L characteristic can be approximated by a linear function with no problem, recording power can be corrected at high speed by linear approximation with the detector fixed to the measurement mode 1 or, at a temperature where linear approximation of the I-L characteristic would expand the error and invite faulty recording, the recording power correction method according to the invention can be applied to accomplish accurate *k* recording power correction while switching over between the measurement mode 1 and the measurement mode 2. Incidentally, the variance rate of acquired data and the temperature at which a switch-over to the mode 2 is to take place (5% and 60° C., respectively) can obviously be selected as desired. It is also conceivable to enhance the S/N ratio of data acquisition by taking in and averaging data a number of times and performing correction according to the averaged data.

To add, instead of arranging the thermistor 19 and the thermal sensor IC 61 near the semiconductor laser 16 as the temperature detecting means, it is also possible to infer the temperature from the value of the slope control DAC 12.

Figure 11:
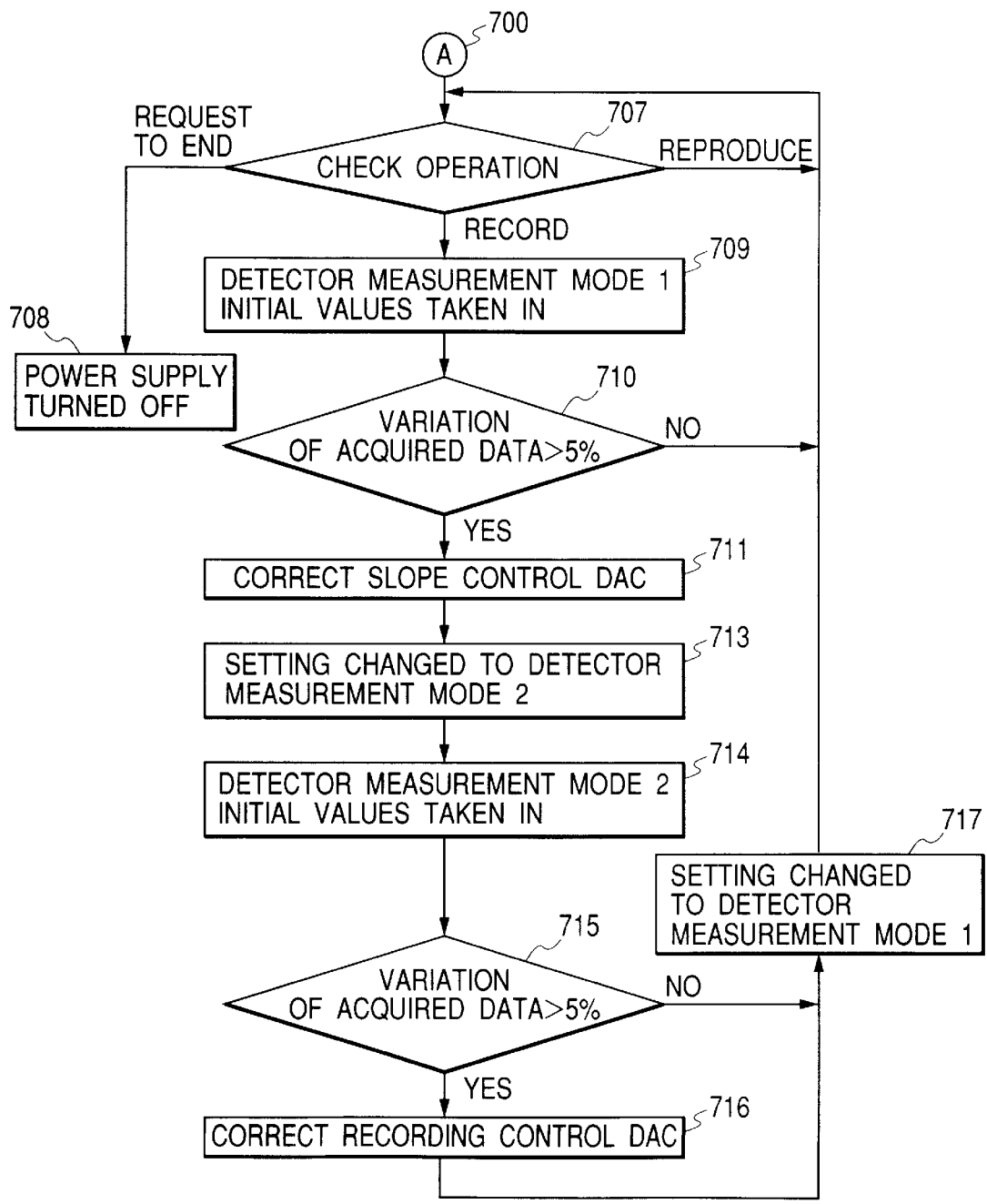
FIG. 11 is a flow chart for describing correction to be applied to a current generating means by using variations in peak power in the fourth preferred embodiment of the invention at the time of recording.

FIG. 11 illustrates a fourth preferred embodiment of the invention, which is an optical disk device characterized in that the temperature is inferred from value of the slope control DAC 12. This fourth embodiment of the invention has the same configuration as the optical disk device 1, which is the first embodiment of the invention, described with reference to FIG. 1. However, neither the thermistor 19 and the voltage converting circuit 36 nor the thermal sensor IC 61 is needed. Further, as the fourth embodiment has common parts to the third embodiment where it was described with reference to FIG. 4, their illustration and description are dispensed with.

FIG. 11, like FIG. 5, is a flow chart of a program to be executed by the microcomputer possessed by the arithmetic and control circuit 3, and shows a continuation from the terminal A numbered 700 in FIG. 4. In this embodiment, instead of using the thermistor 19 and the thermal sensor IC 61 as the temperature detecting means, if the results of measurement of peak power at step 709 are compared with the previous values in the measurement mode 1 (if it is the first time, compared with the initial learned values P1) (710) and the variance is found greater than 5%, it is judged that the I-L characteristic may have deviated from a straight line and become curved, and the detector is switched over to the mode 2 in which the bottom power is detected by step 713 to take in data in the measurement mode 2 by step 714.

As a semiconductor laser differs in the performance of radiation of heat generated by the laser chip with the material and structure of the package for mounting the laser chip, the I-L characteristic of the semiconductor laser 16 may deviate from a straight line and become curve even if its temperature has not reached 60° C. Therefore, the method of this embodiment to infer the variation in the I-L characteristic according to the variation in peak power measured at step 709, instead of using the thermistor 19 and the thermal sensor IC 61 as the temperature detecting means, can prove effective.

According to the present invention, there can be realized semiconductor laser luminescent power control unit capable of accurately controlling the luminescent power of the semiconductor laser in an optical recording/reproduction device, such as an optical disk device wherein information is recorded or reproduced optically by focusing a laser beam emitted from a laser beam source into a minute light spot and irradiating therewith an optical disk, which is an information recording medium, even when the surroundings of the semiconductor laser are heated to a high temperature.

The invention may be embodied in other specific forms without departing from the spirit or essential characteristics thereof. The present embodiment is therefore to be considered in all respects as illustrative and not restrictive, the scope of the invention being indicated by the appended rather than by the foregoing description and all changes which come within the meaning and range of equivalency of the claims are therefore intended to be embraced therein.

What is claimed is:

1. An optical disk device comprising a semiconductor laser, a current generator for supplying a D.C. or pulse-shaped drive current to said semiconductor laser, a power detector for detecting the luminescent power of said semiconductor laser, a peak detector for detecting the peak level of the output signal of said power detector, a bottom detector for detecting the bottom level of the output signal of said power detector, an arithmetic and control unit having programs for computing the drive current of said semiconductor laser and controlling the drive current of said current generator according to the result of computation, and a thermal detector for detecting the temperature of said semiconductor laser, wherein said arithmetic and control unit has a plurality of current computing programs for computing the drive current of said semiconductor laser by different methods and a program for selecting one current computing program, out of said plurality of current computing programs, according to a temperature signal supplied by said thermal detector.

2. The optical disk device, according to claim 1, wherein said plurality of current computing programs possessed by said arithmetic and control unit include a first current computing program for acquiring the temperature of said semiconductor laser from a temperature signal supplied by said thermal detector and computing the drive current of said semiconductor laser from the output signal of said power detector and the output signal of said peak detector, and a second current computing program for computing the drive current of said semiconductor laser from the output signal of said power detector, the output signal of said peak detector and the output signal of said bottom detector, a program for selecting said current computing program selecting said first current computing program if the temperature of said semiconductor laser is below a prescribed level or said second current computing program if the temperature of said semiconductor laser is above the prescribed level.

3. The optical disk device, according to claim 2, further comprising an automatic power control circuit for keeping the luminescent power of said semiconductor laser constant by supplying a D.C. drive current to said semiconductor laser, wherein said plurality of current computing programs possessed by said arithmetic and control unit include a third current computing program for acquiring the temperature of said semiconductor laser from a temperature signal supplied by said thermal detector and computing the drive current of said semiconductor laser from the output signal of said peak detector, and a fourth current computing program for computing the drive current of said semiconductor laser from the output signal of said peak detector and the output signal of said bottom detector, a program for selecting said program selecting said third current computing program if the temperature of said semiconductor laser is below a prescribed level or said fourth current computing program if the temperature of said semiconductor laser is above the prescribed level.

4. An optical disk device comprising a semiconductor laser, a current generator for supplying a D.C. or pulse-shaped drive current to said semiconductor laser, a power detector for detecting the luminescent power of said semiconductor laser, a peak detector for detecting the peak level of the output signal of said power detector, a bottom detector for detecting the bottom level of the output signal of said power detector, and an arithmetic and control unit having programs for computing the drive current of said semiconductor laser and controlling the drive current of said current generator according to the result of computation, wherein said arithmetic and control unit has a temperature variation detecting program for detecting any temperature variation in said semiconductor laser, a plurality of current computing programs for computing said semiconductor laser drive current by different methods, and a program for selecting one current computing program, out of said plurality of current computing programs, according to the result obtained by the temperature variation detecting program.

5. The optical disk device, according to claim 4, wherein said plurality of current computing programs possessed by said arithmetic and control unit include a first current computing program for computing the drive current of said semiconductor laser from the output signal of said power detector and the output signal of said bottom detector, and a second current computing program for computing the drive current of said semiconductor laser from the output signal of said power detector, the output signal of said peak detector and the output signal of said bottom detector, a program for selecting said current computing program selecting said first current computing program if the result obtained by the temperature variation detecting program is below a prescribed level or said second current computing program if the result obtained by the temperature variation detecting program is above the prescribed level.

6. The optical disk device, according to claim 5, further comprising an automatic power control circuit for keeping the luminescent power of said semiconductor laser constant by supplying a D.C. drive current to said semiconductor laser, wherein said plurality of current computing programs possessed by said arithmetic and control unit include a third current computing program for computing the drive current of said semiconductor laser from the output signal of said bottom detector, and a fourth current computing program for computing the drive current of said semiconductor laser from the output signal of said peak detector and the output signal of said bottom detector, a program for selecting said current computing program selecting said third current computing program if the result obtained by the temperature variation detecting program is below a prescribed level or said fourth current computing program if the result obtained by the temperature variation detecting program is above the prescribed level.

7. A semiconductor laser luminescent power control method comprising a step of supplying a D.C. or pulse-shaped drive current to a semiconductor laser, a power detecting step of detecting the luminescent power of said semiconductor laser, a peak detecting step of detecting the peak level of the output signal obtained at said power detecting step, a bottom detecting step of detecting the bottom level of the output signal of said power detecting step, steps of computing the drive current of said semiconductor laser, and a thermal detecting step of detecting the temperature of said semiconductor laser, wherein said steps of computing the drive current of said semiconductor laser have a plurality of current computing steps of computing the drive current of said semiconductor laser by different methods and a step of selecting one current computing step, out of said plurality of current computing steps, according to a temperature signal detected at said thermal detecting step.

8. The semiconductor laser luminescent power control method according to claim 7, wherein said steps of computing the drive current of said semiconductor laser include a first current computing step of acquiring the temperature of said semiconductor laser at said thermal detecting step and computing the drive current of said semiconductor laser from the output signals of said power detecting step and said peak detecting step, and a second current computing step of computing the drive current of said semiconductor laser from the output signals of said power detecting step, the output signal of said peak detecting step and the output signal of said bottom detecting step, at a step of selecting said current computing step there is selected said first current computing step if the temperature of said semiconductor laser is below a prescribed level or said second current computing step if the temperature of said semiconductor laser is above the prescribed level.

9. The semiconductor laser luminescent power control method according to claim 8, further comprising an automatic power control step of keeping the luminescent power of said semiconductor laser constant by supplying a D.C. drive current to said semiconductor laser, wherein said plurality of current computing steps include a third current computing step of acquiring the temperature of said semiconductor laser from a temperature signal supplied at said thermal detecting step and computing the drive current of said semiconductor laser from the output signal of said peak detecting step, and a fourth current computing step of computing the drive current of said semiconductor laser from the output signal of said peak detecting step and the output signal of said bottom detecting step, at said current computing step of selecting said current computing step there is selected said third current computing step if the temperature of said semiconductor laser is below a prescribed level or said fourth current computing step if the temperature of said semiconductor laser is above the prescribed level.

10. A semiconductor laser luminescent power control method comprising a step of supplying a D.C. or pulse-shaped drive current to a semiconductor laser, a power detecting step of detecting the luminescent power of said semiconductor laser, a peak detecting step of detecting the peak level of the output signal of said power detecting step, a bottom detecting step of detecting the bottom level of the output signal of said power detecting step, and computing and controlling steps of computing and controlling the drive current of said semiconductor laser, wherein said computing and controlling steps have a temperature variation detecting step of detecting any temperature variation in said semiconductor laser, a plurality of current computing steps of computing said semiconductor laser drive current by different methods and a step of selecting one current computing step, out of said plurality of current computing steps, according to the result obtained at the temperature variation detecting step.

11. The semiconductor laser luminescent power control method according to claim 10, wherein said plurality of current computing steps include a first current computing step of computing the drive current of said semiconductor laser from the output signal of said power detecting step and the output signal of said bottom detecting step, and a second current computing step of computing the drive current of said semiconductor laser from the output signal of said power detecting step, the output signal of said peak detecting step and the output signal of said bottom detecting step, at a step of selecting said current computing step there is selected said first current computing step if the result obtained at the temperature variation detecting step is below a prescribed level or said second current computing step if the result obtained at the temperature variation detecting step is above the prescribed level.

12. The semiconductor laser luminescent power control method according to claim 11, further comprising an automatic power control step of keeping the luminescent power of said semiconductor laser constant by supplying a D.C. drive current to said semiconductor laser, wherein said plurality of current computing steps include a third current computing step of computing the drive current of said semiconductor laser from the output signal of said bottom detecting step, and a fourth current computing step of computing the drive current of said semiconductor laser from the output signal of said peak detecting step and the output signal of said bottom detecting step, at said plurality of current computing steps of selecting said plurality of current computing steps there is selected said third current computing step if the result obtained at the temperature variation detecting step is below a prescribed level or said fourth current computing step if the result obtained at the temperature variation detecting step is above the prescribed level.

* * * * *